United States Patent
Elkins et al.

(10) Patent No.: US 9,620,249 B2
(45) Date of Patent: Apr. 11, 2017

(54) DEBRIS SHIELD UPPER TIE PLATE FOR NUCLEAR FUEL ASSEMBLY AND METHOD TO SHIELD ASSEMBLY FROM DEBRIS

(75) Inventors: Robert B. Elkins, Wilmington, NC (US); Russell Fawcett, Atkinson, NC (US); David Smith, Leland, NC (US); Michael Kiernan, Wilmington, NC (US); Russell Stachowski, Wilmington, NC (US); Gerald A. Luciano, Wilmington, NC (US); Michael S. DeFilippis, Wilmington, NC (US); Carlton Clark, Wilmington, NC (US); Richard Carl Longren, Wilmington, NC (US)

(73) Assignee: Global Nuclear Fuel—Americas, LLC, Wilmington, NC (US)

( * ) Notice: Subject to any disclaimer, the term of this patent is extended or adjusted under 35 U.S.C. 154(b) by 1062 days.

(21) Appl. No.: 11/848,548

(22) Filed: Aug. 31, 2007

(65) Prior Publication Data

US 2009/0060113 A1    Mar. 5, 2009

(51) Int. Cl.
| | | |
|---|---|---|
| *B29C 70/44* | (2006.01) | |
| *G21C 3/32* | (2006.01) | |
| *G21C 9/00* | (2006.01) | |
| *G21C 1/04* | (2006.01) | |
| *G21C 3/33* | (2006.01) | |
| *G21C 3/344* | (2006.01) | |

(52) U.S. Cl.
CPC ............. *G21C 3/3206* (2013.01); *G21C 3/33* (2013.01); *G21C 3/344* (2013.01); *Y02E 30/40* (2013.01)

(58) Field of Classification Search
CPC ........ G21C 3/3206; G21C 3/344; G21C 3/33; Y02E 30/40
USPC .......................... 376/305, 302, 347; 264/258
See application file for complete search history.

(56) References Cited

U.S. PATENT DOCUMENTS

| | | | |
|---|---|---|---|
| 3,128,235 A | | 4/1964 | Hackney et al. |
| 3,182,003 A | * | 5/1965 | Thorp, II et al. ............. 376/446 |
| 3,375,172 A | | 3/1968 | Mansson et al. |
| 4,035,233 A | | 7/1977 | Williamson et al. |
| 4,420,458 A | | 12/1983 | Dunlap et al. |
| 4,663,118 A | | 5/1987 | Nelson |
| 4,675,154 A | | 6/1987 | Nelson et al. |
| 4,684,495 A | | 8/1987 | Wilson et al. |

(Continued)

FOREIGN PATENT DOCUMENTS

| | | |
|---|---|---|
| EP | 0 289 829 | 11/1988 |
| EP | 0 311 037 | 4/1989 |

(Continued)

OTHER PUBLICATIONS

Office action issued in connection with JP Patent Application No. 2008-212313, Jun. 7, 2013.

*Primary Examiner* — Frank J McGue
(74) *Attorney, Agent, or Firm* — Nixon & Vanderhye P.C.

(57) ABSTRACT

A nuclear reactor fuel bundle assembly including: a fuel bundle including an array of fuel rods and water rods mounted in an upper tie plate and housed in walls of a channel, and a pore type debris shield mounted at least partially in the channel, above or below the upper tie plate, the shield extending to or over the walls of the channel, whereby deflecting and/or capturing falling debris from entering the fuel assembly, wherein the shield is design to be durable, yet flexible, and porous.

3 Claims, 4 Drawing Sheets

(56) References Cited

U.S. PATENT DOCUMENTS

| | | |
|---|---|---|
| 4,828,791 A | 5/1989 | DeMario |
| 4,832,905 A | 5/1989 | Bryan et al. |
| 4,876,063 A | 10/1989 | Johansson |
| 4,957,698 A | 9/1990 | Ritter |
| 5,017,332 A | 5/1991 | Dix et al. |
| 5,024,806 A | 6/1991 | Cioffi et al. |
| 5,094,802 A | 3/1992 | Riordan, III |
| 5,112,570 A | 5/1992 | Dix et al. |
| 5,339,342 A * | 8/1994 | Meier et al. ............... 376/446 |
| 5,361,287 A | 11/1994 | Williamson |
| 5,365,558 A | 11/1994 | Lippert et al. |
| 5,384,814 A * | 1/1995 | Matzner et al. ............ 376/352 |
| 5,390,221 A * | 2/1995 | Dix et al. ................... 376/352 |
| 5,479,461 A | 12/1995 | Kilian |
| 5,483,564 A * | 1/1996 | Matzner et al. ............ 376/352 |
| 5,490,189 A | 2/1996 | Schechter |
| 5,524,031 A | 6/1996 | Kilian |
| 5,748,694 A * | 5/1998 | King ............................ 376/313 |
| 5,787,140 A | 7/1998 | Dunlap et al. |
| 5,809,101 A * | 9/1998 | Dunlap et al. ............. 376/446 |
| 6,032,807 A * | 3/2000 | Sternberg et al. .......... 210/491 |
| 6,581,667 B2 | 6/2003 | Waring |
| 6,608,880 B2 | 8/2003 | Smith et al. |
| 6,690,758 B1 | 2/2004 | Elkins |
| 2004/0013221 A1* | 1/2004 | Elkins ........................ 376/313 |
| 2005/0157836 A1 | 7/2005 | Broach et al. |
| 2005/0238131 A1 | 10/2005 | Hellandbrand, Jr. et al. |
| 2006/0018422 A1* | 1/2006 | Mayer ........................ 376/409 |
| 2006/0045231 A1 | 3/2006 | Lee et al. |

FOREIGN PATENT DOCUMENTS

| | | |
|---|---|---|
| EP | 0 418 628 | 3/1991 |
| EP | 0 422 950 | 4/1991 |
| EP | 2 031 599 | 3/2009 |
| EP | 2 031 600 | 3/2009 |
| FR | 1213496 A2 * | 4/1960 |
| JP | 54-87378 | 7/1979 |
| JP | 54087378 A * | 7/1979 |
| JP | 61083995 A * | 4/1986 |
| JP | 2005172461 A * | 6/2005 |
| JP | 2009-58505 | 3/2009 |
| JP | 2009-58506 | 3/2009 |
| WO | 03/009306 | 1/2003 |

* cited by examiner

DEBRIS SHIELD UPPER TIE PLATE FOR NUCLEAR FUEL ASSEMBLY AND METHOD TO SHIELD ASSEMBLY FROM DEBRIS

BACKGROUND OF THE INVENTION

The present invention relates to a nuclear fuel assembly including a fuel bundle and a tie plate for supporting the fuel assembly and, particularly, relates to a debris shield attached to the Upper Tie Plate (UTP) of the fuel bundle assembly.

In a fuel assembly, liquid coolant/moderator flows into the assembly thru the bottom and exits as a water/steam mixture from the top. The core includes a plurality of fuel bundles arranged in vertical side-by-side relation, each containing a plurality of fuel rods. The fuel bundles include a housing formed by a hollow metal channel. The fuel bundles also include one or more tie plates that support the fuel rods in the bundle. Generally a bundle includes an upper tie plate near the top of the fuel assembly and a lower tie plate at the bottom of the fuel assembly.

Debris may fall through a conventional upper tie-plate and become lodged within the fuel assembly where the debris may cause fuel rod fretting during normal operating conditions. Fretting is potentially damaging to the fuel rods, resulting in what is typically known as a "leaker".

Conventional efforts to address debris falling down into a fuel assembly typically focus on prevention of debris within the coolant itself and coolant flow passages. Conventional efforts typically involve administrative controls regarding the treatment of coolant flow passages and handling of fuel assemblies such that debris does not enter the passages or the fuel assemblies. These controls are designed to alleviate the sources of debris such that debris does not fall down into fuel assemblies. Nevertheless, there is a risk that debris will fall into a fuel assembly, especially while the coolant flow stops and the reactor core is open. There is a long felt need for procedures and devices to ensure that debris does not fall into fuel assemblies, especially while the coolant flow is stopped, during refuel operations, and in a reverse coolant flow pattern.

BRIEF DESCRIPTION OF THE INVENTION

A nuclear reactor fuel bundle assembly is disclosed including: a fuel bundle including an array of fuel rods mounted in an upper tie plate and housed in a channel, and a debris shield mounted at least partially within the channel and above or below the upper tie plate, the shield extending to or over the channel, wherein the shield is porous.

A nuclear reactor fuel bundle assembly is disclosed comprising: a fuel bundle including an array of fuel rods mounted in an upper tie plate and housed in a channel, and a debris shield matrix mounted at least partially in the channel and above below the upper tie plate, wherein the matrix has a surface at least coextensive with an open upper area of the fuel bundle.

A method is disclosed to prevent debris falling into a nuclear reactor fuel assembly including an array of fuel rods mounted in an upper tie plate and housed within a channel, the method comprising: inserting a debris shield to cover an upper open area of the channel, wherein the insertion of the shield places the shield over or below the upper tie plate; maintaining the shield over or below the upper tie plate, while the fuel bundle is in an operating mode within a nuclear reactor core; flowing coolant through the bundle and debris shield during operation of the core, and capturing debris falling down into the fuel assembly from above with the debris shield.

DETAILED DESCRIPTION OF THE INVENTION

Figure 1:
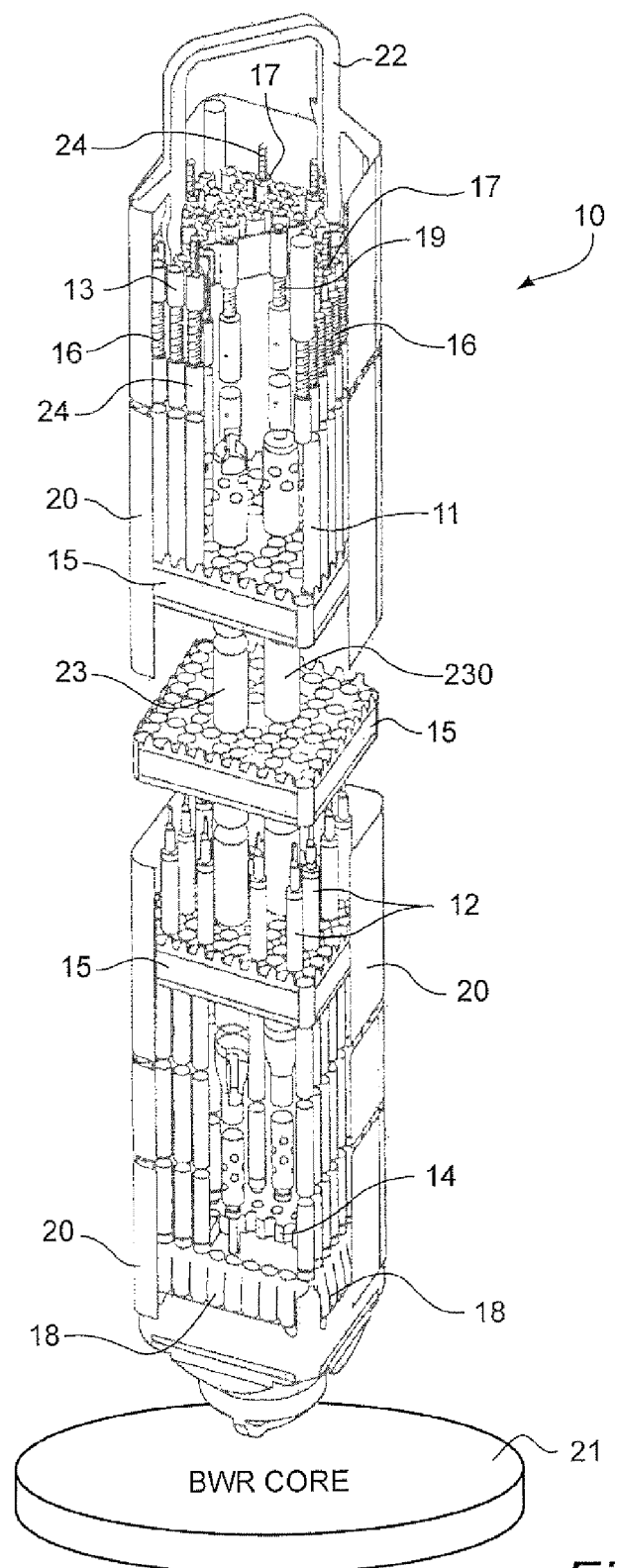
FIG. 1 is a side, cross-sectional view of a conventional fuel assembly, with a portion of the channel and fuel rods, tie plates, and the water rods cut away.

FIG. 1 is a side view showing in cross-section a fuel assembly 10 shaped generally as a vertical column with a square cross-section. The assembly typically includes, for example, an array of full-length fuel rods 11 and part-length fuel rods 12 arranged in parallel. The fuel rods are supported by an upper tie plate 13, a lower tie plate 14, and one or more spacers 15 arranged at locations along the length of the fuel rods. Expansion springs 16 extend from the upper end plug of the full length fuel rods 11 to the under side of the upper tie plate 13. Hex nuts 17 secure the tie rods 24, that extend through the upper tie plate while the opposite end of each tie rods is secured into the lower tie plate of the fuel assembly. The tie plates, especially lower tie plate, includes finger springs 18 on the outer sidewalls of the lower tie plate that engage a channel 20 that provides a hollow housing for the bundle of fuel rods 11, 12, water rods 23, 230, tie plates 13, 14, tie rods 24, and spacers 15.

The channel 20 is typically an elongated hollow tube, rectangular in cross-section and having a length that covers the length of fuel rods in the fuel assembly. Generally, a U-shaped lifting handle 22 is attached or part of the upper tie plate 13. The handle 22 may be used to raise and lower the fuel bundle assembly 10 into a reactor core 21 or to otherwise move the assembly.

Debris may enter the top of the fuel bundle 10 during non-operating or operating conditions such as, refuel, new fuel receipt, transport to core, when the coolant flow stops flowing upward through the core, and when flow may be stagnate or reversed. Debris falling into the top of the fuel bundle may become lodged in a tie plate, spacer bracket, between the rods or between a channel wall and a rod. The crevices in the fuel bundle can trap the debris in the bundle. The debris may fall below the upper tie plate 13 and become lodged in a location in the bundle where it could cause fuel rod 11, 12 fretting during operating conditions.

Figure 2:
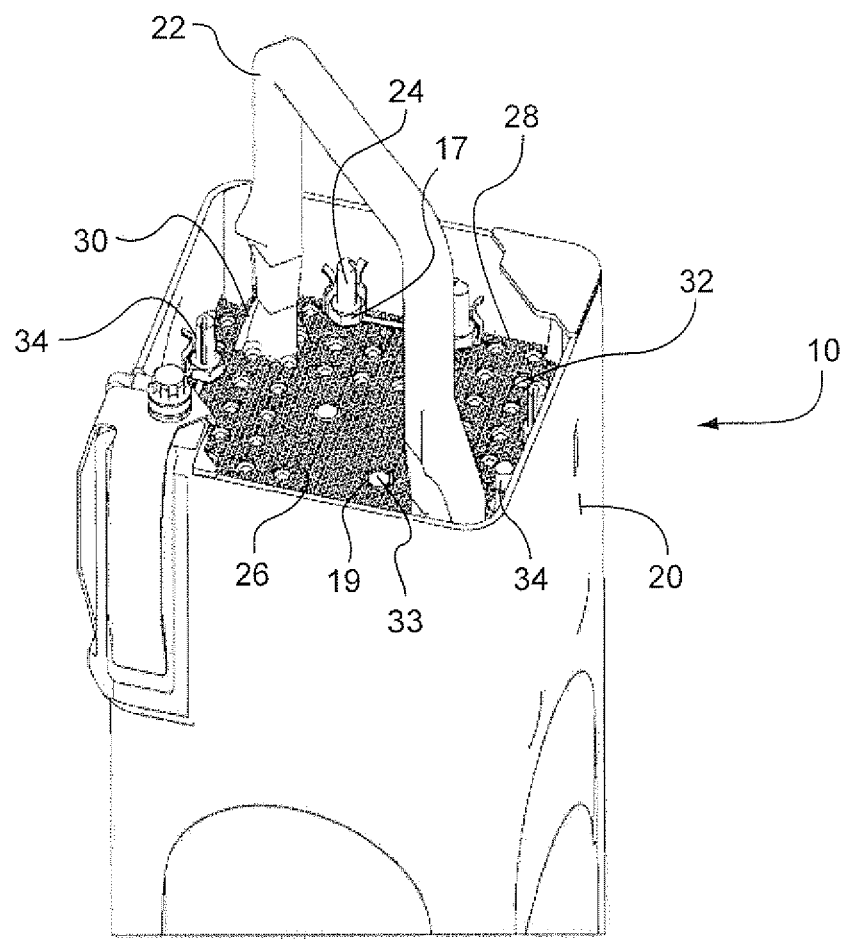
FIG. 2 is a perspective view of the top and sides of an upper portion of a fuel assembly with a first embodiment of a perforated plate to prevent debris from falling into the fuel assembly.

FIG. 2 shows a debris shield 26 over the upper tie plate in a fuel bundle 10 to be placed within the core of a nuclear power reactor. The debris shield 26 may be a generally planar porous material, such as a flat mesh plate, having edges 28 that abut the interior surfaces of the channel walls 20. The debris shield may or may not be attached or integral to the upper tie plate, channel, water rod, or other load-bearing component that forms the top of a fuel assembly 10.

The planar debris shield 26 may be a wire or fabric mesh, sponge, grid, array of crossing bars or slats, or other matrix. The debris shield may be flexible to facilitate its insertion into the bundle and past the lifting handle 22. The insertion may require the shield to slide over the lifting handle 22 and to seat the shield on the top of the upper tie plate. Slits 30 may be included in the debris shield 26 to allow the shield to fit over and between the lifting handle 22. The shield may have apertures 32, 33 that fit over exposed tips and nubs of the full length fuel rods, water rods, and tie rods that extend upward through the upper tie plate. The larger apertures 33 may be aligned with an upper end plug 19 of a water rod and a clip, hex nut or other shield securing device may fit through the aperture 33 and into the end plug 19. The apertures 32 fit snugly over the tips and nubs to prevent debris from falling through the apertures and down into the fuel assembly. Further, the shield may be held in place by the hex nuts 17 that secure the tie rods 24 to the top of the upper tie plate while the lock-tabs 34 secure the hex nuts from coming loose from each of the tie rods within the fuel bundle.

The debris shield 26 may remain in the fuel assembly during operation of the nuclear reactor core. The debris shield 26 preferably has a porosity, open mesh or matrix structure that allows coolant, especially emergency coolant, to flow through the shield without substantial flow resistance. The porous, mesh or matrix structure of the debris shield blocks the passage of debris. The debris shield serves as a filter that allows passage of fluids, such as cooling fluid, and blocks the passage of particulates. Preferably the debris shield should block the passage of particles of debris material having a pore size that minimizes the size of the debris while maintaining the optimal flow of coolant.

Figure 3:
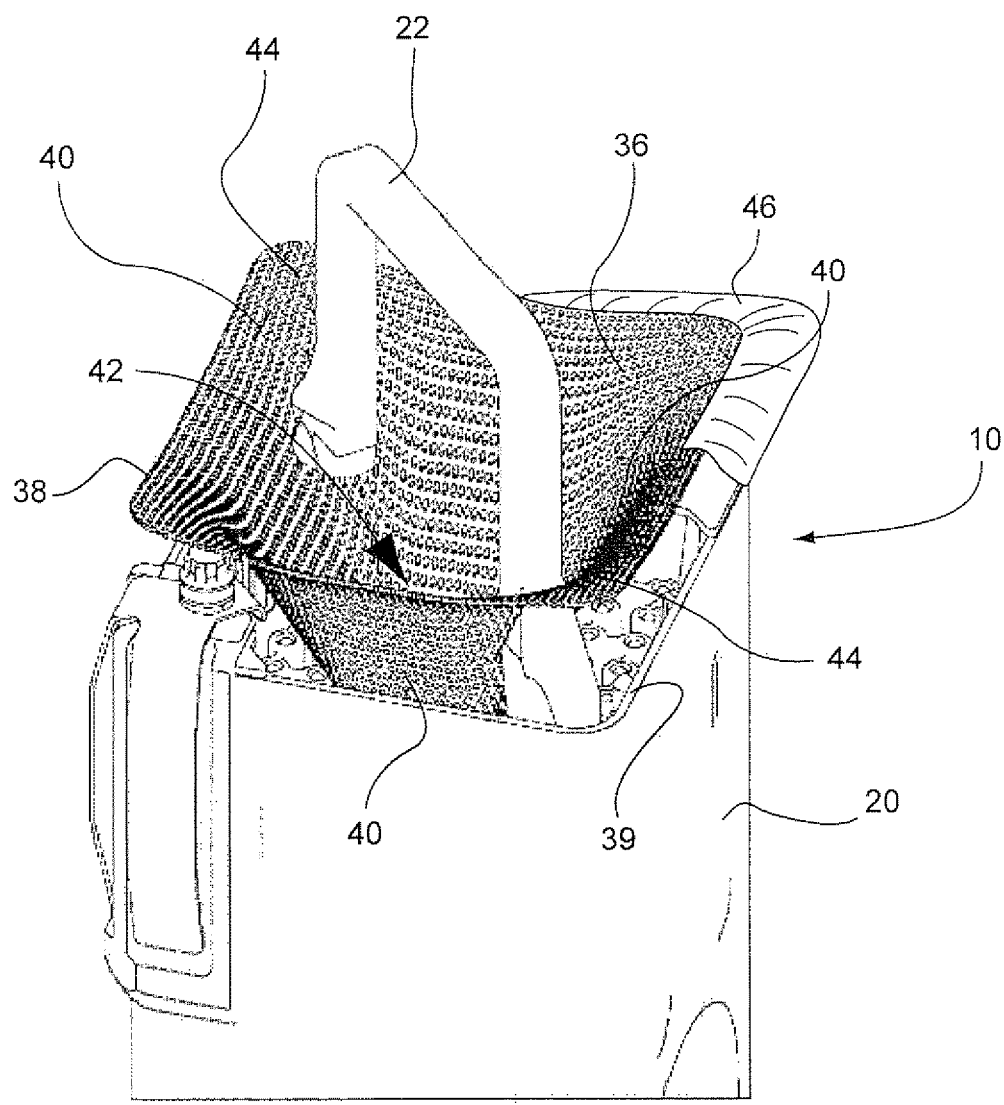
FIG. 3 is a perspective view of the top and sides of an upper portion of a fuel assembly with a cone shaped debris shield to prevent debris from falling into the fuel assembly.

FIG. 3 is a perspective view of a fuel bundle assembly 10 with a cone shaped debris shield 36 inserted in the top of the fuel assembly 10. The cone shaped debris shield 36 may be formed of a mesh, matrix or other porous structure having a generally inverted conical, pyramidal or cup shape. The debris shield 36 includes an upper rim 38 that extends vertically above the upper edge 39 of the channel wall 20 of the bundle, and may or may not extend horizontally beyond the channel walls. The shield 36 with the rim 38 effectively functions as a net to capture debris falling down from above, into the top of the fuel bundle. Because the rim 38 preferably extends at least to and beyond the upper edge 39 of the channel walls 20, debris is captured or deflected by the shield and does not fall into the top of the fuel bundle assembly. Debris falls onto the upper surface of the shield 36 and slides or rolls along one of the sloped interior sidewalls 40 to the bottom 42 of the shield, where the debris is to may be retained by gravity or stagnant flow area during operation.

The bottom 42 of the debris shield 36 may be a mesh, porous or of a solid material. Coolant flows through the mesh or porous bottom of the shield. A solid bottom 42 forms a stagnant flow area into which debris may be captured. The debris may be retained in the bottom 42 of the shield 36 until the fuel bundle 10 is removed from the reactor core or maintenance is performed on the bundle. The shield 36 may be formed of a flexible web like material. During maintenance, the shield may be folded to retain the debris and thereafter removed from the fuel bundle assembly and later unfolded to discharge the debris retained in the bottom of the shield.

The shield 36 may be formed of a flexible web, porous sheet or matrix that is shaped to conform to fit into the top of the fuel bundle. The material forming the shield should withstand service in a nuclear reactor core. Slits 44 in the shield enable the shield to be fitted through the U-shaped lifting handle 22 and inserted into the fuel bundle assembly 10. Alternatively, the shield 36 may split and be stitched together after having been placed in the top of the fuel assembly. The threaded end plugs on the upper end plug 19 of the waters rods may secure the pieces of the shield 36 such that the pieces are adjacent and form a single shielding device for catching debris. While preferably flexible for installation in the bundle, the shield has sufficient rigidity to retain its shape once installed in the upper tie plate of the fuel assembly.

An upper umbrella 46 may fit over the rim 38 of the cone shaped debris shield 36 and deflect debris away from the interior of the fuel assembly. The umbrella may form a ring, e.g., a rectangular ring, that is attached to the rim 38 of the debris shield 36. The umbrella 46 may be sloped downward from the inner edges of the ring to the outer edges so as to deflect debris away from the fuel assembly 10. The umbrella 46 may be wire mesh, or otherwise porous to avoid interfering with the flow of coolant past the fuel assembly. A solid umbrella on top of the fuel assembly may also be acceptable if it does not adversely interfere with coolant flow.

Figure 4:
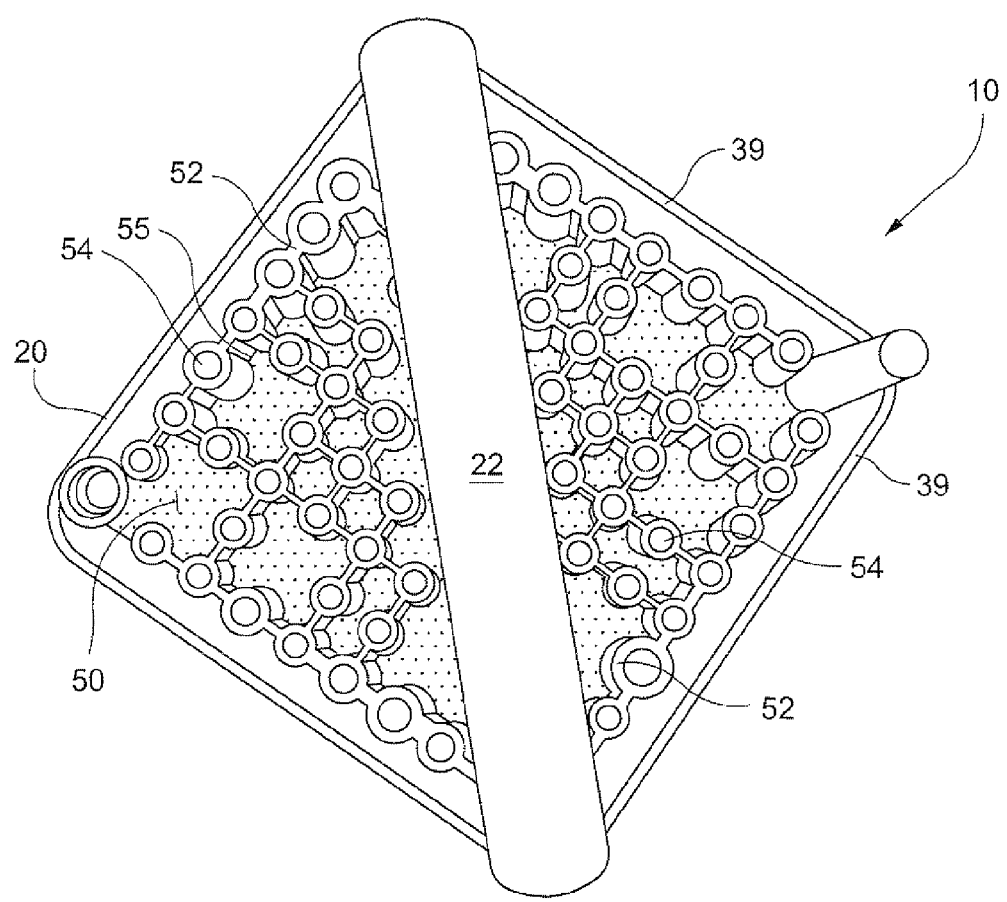
FIG. 4 is a top down view of the top of a fuel assembly showing a perforated plate debris shield attached to the bottom side of the upper tie plate.

FIG. 4 is a top down view of the top of a fuel assembly 10 showing a debris shield plate 50 attached to the bottom of an upper tie plate 52. The debris shield plate 50 is a metallic plate with small diameter apertures that are drilled cut or stamped into the plate. The debris shield plate 50 is attached to the bottom of the upper tie plate by means of welding, clips, screws or other attachments 55. The debris shield plate may have both large and small apertures, arranged in the same pattern of the apertures 54 on the upper tie plate 52. The small apertures are to receive the upper end plugs on each of the full length rods 11 and the tie rods 24 in the fuel bundle. The debris shield plate may be held in place by the fuel rod expansion springs 16 and pressed upward to the underside of the upper tie plate 13. The fuel rods extend through the debris shield plate and upper tie plate where the tie rods are secured by the hex nuts 17 and the lock-tabs 34.

A debris shield is disclosed herein mitigates the entry of foreign material into the top of a fuel assembly. The debris shield may consist of a plurality of holes or a missile shield such that the device deflects, catches, or removes foreign materials potentially introduced into the top of the fuel assembly.

The debris shields 26, 36 and 50 shown in FIGS. 2, 3 and 4 are exemplary shields. The debris shield 26 shown in FIG. 2 is configured as a perforated plate mounted over an upper tie plate 13. The debris shield 36 in FIG. 3 has a shape that blocks downwardly flowing debris and has relatively little resistive area to emergency cooling flow and allows recirculation of fluid flowing through and around the shield to the top of the bundle during application of the emergency core cooling system. The flat perforated plate debris shield 50 shown in FIG. 4 is attached to the bottom of the upper tie plate and is relatively unobtrusive. Debris shields having other shapes, compositions and arrangements in the top of a fuel bundle assembly may be fashioned to serve the function of preventing debris falling into a bundle, in substantially the same way of blocking passage of debris falling downward into the bundle while passing coolant, to achieve the result of substantially no debris being introduced in the bundle due to debris falling down past the upper tie plate.

By preventing the entry of foreign materials into the fuel bundle assembly, the possibility of a fuel rod fretting failure is substantially reduced. The debris shield catcher should improve the reliability of the fuel assembly.

The use of a debris shield as disclosed herein should prevent debris from falling into a fuel bundle and thereby reduce fuel rod failures due to debris. Similarly, preventing debris falling into the fuel bundle is expected to assure the operational life of the fuel assembly by reducing the risk of fuel rod failure and premature discharge from the reactor core.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A nuclear reactor fuel assembly for an operating reactor nuclear core comprising:
   a channel having a wall;
   a fuel bundle including full length fuel rods, tie rods and at least water rod, wherein the wall extends around the perimeter of the fuel bundle,
   an upper end plug on an upper end of each of the full length fuel rods, the tie rods and the at least one water rod;
   an upper tie plate within the wall of the channel including a planar network of interconnected ribs and first pin support apertures, wherein the first pin support apertures are adapted to receive the upper end plugs and the planar network includes open regions between the ribs and the first pin support apertures, and
   a debris shield including a porous region at least coextensive with the planar network, wherein the porous region includes second pin support apertures, the second pin support apertures are each coaxial with one first pin support apertures, and pores in the porous region are individually smaller than each of the second pin support apertures, and
   wherein the debris shield is adjacent the planar network and is above the full length fuel rods, the tie rods and the at least one water rod.

2. The nuclear reactor fuel assembly in claim 1 wherein the porous region extends at least to the wall of the channel.

3. The nuclear reactor fuel assembly in claim 1 wherein the debris shield includes a flat panel section at least coextensive with the planar network of the upper tie plate.

* * * * *